(12) United States Patent
Uchida et al.

(10) Patent No.: US 10,204,321 B2
(45) Date of Patent: Feb. 12, 2019

(54) DEVICE FOR SEARCHING AND METHOD FOR SEARCHING FOR SIMILAR BREAKDOWN CASES

(75) Inventors: Takayuki Uchida, Tokyo (JP); Hideaki Suzuki, Tokyo (JP); Junsuke Fujiwara, Tokyo (JP); Shinya Yuda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 611 days.

(21) Appl. No.: 14/413,448

(22) PCT Filed: Jul. 11, 2012

(86) PCT No.: PCT/JP2012/067661
§ 371 (c)(1),
(2), (4) Date: Jan. 8, 2015

(87) PCT Pub. No.: WO2014/010039
PCT Pub. Date: Jan. 16, 2014

(65) Prior Publication Data
US 2015/0161573 A1    Jun. 11, 2015

(51) Int. Cl.
*G06F 17/30* (2006.01)
*G06Q 10/00* (2012.01)
*G06Q 50/10* (2012.01)

(52) U.S. Cl.
CPC ....... *G06Q 10/20* (2013.01); *G06F 17/30675* (2013.01); *G06Q 50/10* (2013.01)

(58) Field of Classification Search
CPC ................................................. G06F 7/60
See application file for complete search history.

(56) References Cited

U.S. PATENT DOCUMENTS

| | | |
|---|---|---|
| 2002/0193923 A1 | 12/2002 | Toyama et al. |
| 2003/0115020 A1 | 6/2003 | Adachi et al. |
| 2006/0020380 A1 | 1/2006 | Saito et al. |
| 2007/0202861 A1 | 8/2007 | Adachi et al. |
| 2009/0216399 A1 | 8/2009 | Ishikawa |

(Continued)

FOREIGN PATENT DOCUMENTS

| | | |
|---|---|---|
| JP | 06-294668 A | 10/1994 |
| JP | 10-069397 A | 3/1998 |

(Continued)

OTHER PUBLICATIONS

Extended European Search Report received in corresponding European Application No. 12881021.5 dated Dec. 3, 2015.

(Continued)

*Primary Examiner* — Cheung Lee
(74) *Attorney, Agent, or Firm* — Mattingly & Malur, PC

(57) ABSTRACT

The device for searching for similar breakdown cases according to the present invention includes: a first means that detects a signal abnormality from a repair target machine, calculates the correlations between the signal abnormality and past abnormality cases by means of quantification, and regards the past abnormality cases as similar abnormality cases; a second means that obtains the component repair histories of the repair target machine in the similar abnormality cases by means of quantification; and a third means that, in accordance with the quantified correlations and the quantified component repair histories, determines and provides the priority levels of the plural past similar abnormality cases.

11 Claims, 7 Drawing Sheets

(56) References Cited

U.S. PATENT DOCUMENTS

2012/0166142 A1 6/2012 Maeda et al.
2013/0073260 A1 3/2013 Maeda et al.

FOREIGN PATENT DOCUMENTS

| | | |
|---|---|---|
| JP | 2005-122270 A | 5/2005 |
| JP | 2010-122847 A | 6/2010 |
| JP | 2010-231666 A | 10/2010 |
| JP | 2011-227706 A | 11/2011 |
| WO | 2011/132524 A1 | 10/2011 |
| WO | 2012/032812 A1 | 3/2012 |

OTHER PUBLICATIONS

Translation of Chinese Office Action received in corresponding Chinese Application No. 201280074593.5 dated Dec. 22, 2016.
Martin, M. et al., "Mobilfunkbasiertes Steuerungskonzept fur das Flottenamangement in Tagebauen und Minen", Dec. 21, 2005, pp. 0-205, URL: http://d-nb.info/979486238/34.
Xueming, L., "Study on Intelligence Fault Diagnosis Expert System for Aviation Equipment", Feb. 15, 2009, pp. 16-32.
Communication Pursuant to Article 94(3) EPC received in corresponding European Application No. 12 881 021.5 dated Jul. 11, 2017.
Venkataraman, K., "Maintenance Engineering and Management", Aug. 2007, pp. 175-176, 181, Prentice-Hall of India.
Holmberg, K. et al., "E-maintenance", Aug. 19, 2010, Chapter 1-4, Springer.
Tananbaum, A. S. et al., "Distributed Systems: Principles and Paradigms", Oct. 12, 2006, pp. 0-68, Prentice Hall, Upper Saddle River, NJ.

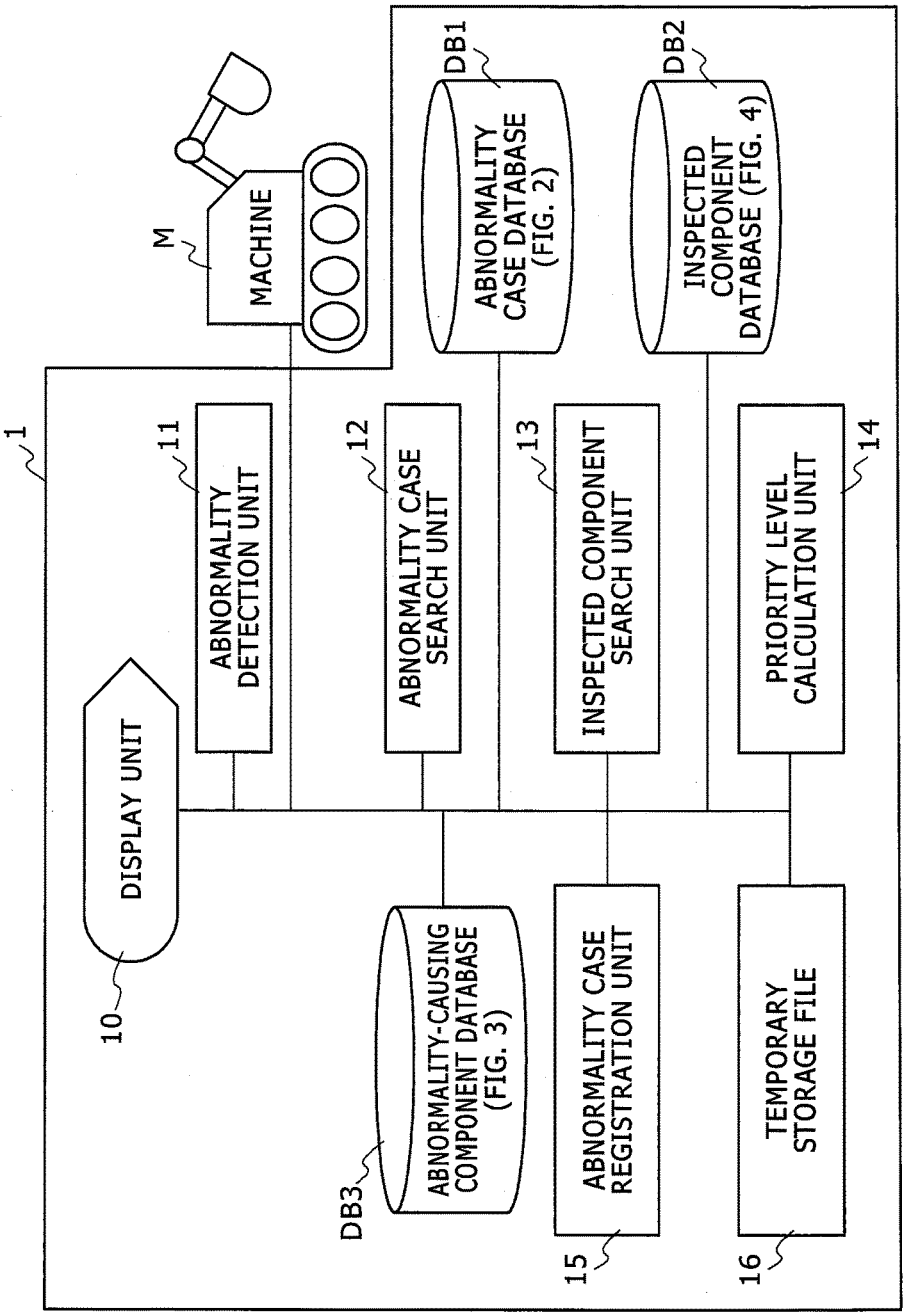

FIG. 2

ABNORMALITY CASE DATABASE (DB1)

| CASE ID (205) | OCCURRENCE DATE AND TIME (210) | DEVIANT VALUE VECTOR (215) | PROCESSING CONTENT (220) | ABNORMALITY MODE ID (225) |
|---|---|---|---|---|
| C001 | 2011/02/02 13:00 | (0.001,0.3, ...) | RECOVER BY RESET | A001 |
| C002 | 2011/03/12 23:34 | (0.14,0.09, ...) | REPLACE COMPONENT P002 | A002 |
| C003 | 2011/03/23 04:50 | (0.16,0.07, ...) | REPAIR COMPONENT Y | A003 |
| ⋮ | ⋮ | ⋮ | ⋮ | ⋮ |
| C010 | 2011/05/13 18:00 | .... | .... | A010 |

FIG. 3

ABNORMALITY-CAUSING COMPONENT DATABASE (DB3)

| ABNORMALITY MODE ID (225) | CAUSAL COMPONENT CANDIDATE ID (260) |
|---|---|
| A001 | P001,P020,P041, ... |
| A002 | P002,P067,P045, ... |
| A003 | P089,P125,P345, ... |
| ⋮ | ⋮ |
| A010 | P010,P015,P021, ... |

FIG. 4

INSPECTED COMPONENT DATABASE (DB2)

| REPAIR/REPLACEMENT DATE AND TIME (285) | REPAIR/REPLACEMENT COMPONENT ID (290) | INSPECTION CAUSE (295) |
|---|---|---|
| 2011/02/02 13:00 | P001,P002, ... | PERIODIC INSPECTION |
| 2011/03/12 23:34 | P002 | RESPONSE TO ABNORMALITY |
| 2011/04/01 12:00 | P010,P011,P012, ... | PERIODIC INSPECTION |
| ⋮ | ⋮ | ⋮ |
| 2011/05/13 19:00 | P010,P021, ... | PERIODIC INSPECTION |

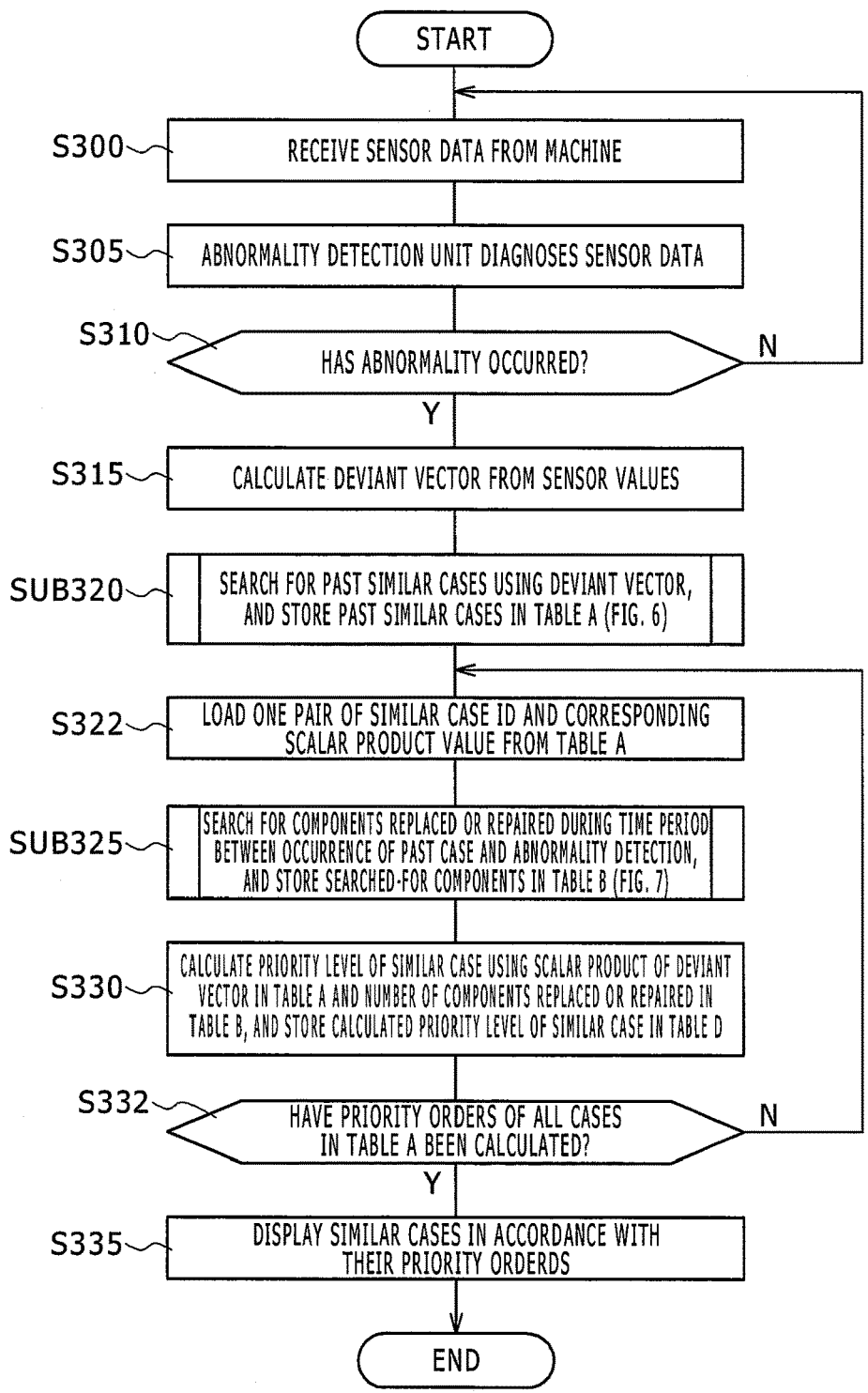

FIG. 9

Table C (TBC) — 635 SIMILAR CASE ID / 260 CAUSAL COMPONENT CANDIDATE ID

| SIMILAR CASE ID | CAUSAL COMPONENT CANDIDATE ID |
|---|---|
| C010 | P010 |
| C010 | P015 |
| C010 | P021 |
| C021 | P024 |
| C021 | P034 |

Table B (TBB) — 635 SIMILAR CASE ID / 290 REPLACEMENT/REPAIR COMPONENT ID

| SIMILAR CASE ID | REPLACEMENT/REPAIR COMPONENT ID |
|---|---|
| C010 | P010 |
| C010 | P021 |
| C021 | P034 |
| ... | ... |

Table D (TBD) — 635 SIMILAR CASE ID / 765 PRIORITY LEVEL

| SIMILAR CASE ID | PRIORITY LEVEL |
|---|---|
| C010 | 1.8 |
| C021 | 2.2 |
| C002 | 1.7 |
| ... | ... |

DEVICE FOR SEARCHING AND METHOD FOR SEARCHING FOR SIMILAR BREAKDOWN CASES

TECHNICAL FIELD

The present invention relates to a device for searching and a method for searching for similar breakdown cases, wherein an abnormality of a machine is detected and a database including past cases is searched in order to inspect whether an abnormality occurred or not in the past using the type of the abnormality of the machine.

BACKGROUND ART

In order to always activate machines such as a gas engine, an elevator, a mining machine, and a construction machine, maintenance work for these machines is indispensable. One of useful technologies in the maintenance work is a technology in which an abnormality of a machine is detected, and a database including past cases is searched in order to inspect whether an abnormality occurred or not in the past using the type of the abnormality of the machine.

If there was a similar abnormality case in the past, measures for remedying the machine can be provided by searching the database, which enables a maintenance person to repair the machine using the provided knowledge. The present invention can be applied to machines that need maintenance work.

For example, Patent Literature 1 discloses one of the above-mentioned techniques for checking abnormalities, the types of which are most similar to the type of the abnormality of a questionable machine, out of similar abnormalities that occurred in the past judging from values detected by sensors mounted on the questionable machine. Subsequently, an abnormality that most frequently occurred of the most similar abnormalities that occurred in the past is regarded as the most likely case, and is provided to a maintenance person.

CITATION LIST

Patent Literature

Patent Literature 1: Japanese Unexamined Patent Application Publication No. Hei6 (1994)-294668

SUMMARY OF INVENTION

Technical Problem

In the technique disclosed in Patent Literature 1, it is assumed that the conditions of machines at the present time are the same as those of the machines at the time of past cases. In actuality, with the tenure of use, the conditions of the machines change owing to the replacement or repair of components of the machines such as engines and the like in common usages.

In consideration of maintenance conditions that occurred in these machines; it cannot be said that past cases and measures taken in response to the past cases necessarily serve as useful references to the present abnormality case.

The present invention was achieved with the above-mentioned problem in mind, and a main object of the present invention is to provide a device for searching and a method for searching for similar breakdown cases, wherein the past cases can be more appropriately searched for while maintenance conditions are taken into consideration.

Solution to Problem

In order to solve the above problem, the device for searching for similar breakdown cases according to the present invention includes: a first means that detects a signal abnormality from a repair target machine, calculates correlations between the signal abnormality and past abnormality cases by means of quantification, and regards the past abnormality cases as similar abnormality cases; a second means that obtains the component repair histories of the repair target machine in the similar abnormality cases by means of quantification; and a third means that, in accordance with the quantified correlations and the quantified component repair histories, determines and provides the priority levels of the plural past similar abnormality cases.

In order to solve the above problem, in the method for searching for similar breakdown cases according to the present invention, a signal abnormality from a repair target machine is detected, the correlations between the signal abnormality and past abnormality cases are calculated by means of quantification, the past abnormality cases are regarded as similar abnormality cases; the component repair histories of the repair target machine in the similar abnormality cases are quantified; and the priority levels of the plural past similar abnormality cases are determined in accordance with the quantified correlations and the quantified component repair histories.

Advantageous Effects of Invention

A diagnosis system according to the present invention adapts a similar case search technology in which, when the abnormality of machine is detected, a database is searched to obtain abnormality cases similar to the abnormality of the machine, and even if the condition has changed owing to repairs or replacements of components, past abnormality cases with high degrees of similarity can be searched for and provided to a maintenance person.

BRIEF DESCRIPTION OF DRAWINGS

FIG. 1 is a diagram showing the entire configuration of a device for searching for similar breakdown cases according to the present invention.

FIG. 2 is a diagram showing a concrete case of an abnormality case database DB1.

FIG. 3 is a diagram showing a concrete case of an abnormality-causing component database DB2.

FIG. 4 is a diagram showing a concrete case of an inspected component database DB3.

FIG. 5 is a process flowchart showing the entire processing for searching for and displaying similar abnormality cases.

FIG. 9 is a diagram showing information expanded in the temporary storage file 16.

DESCRIPTION OF EMBODIMENTS

Figure 6:
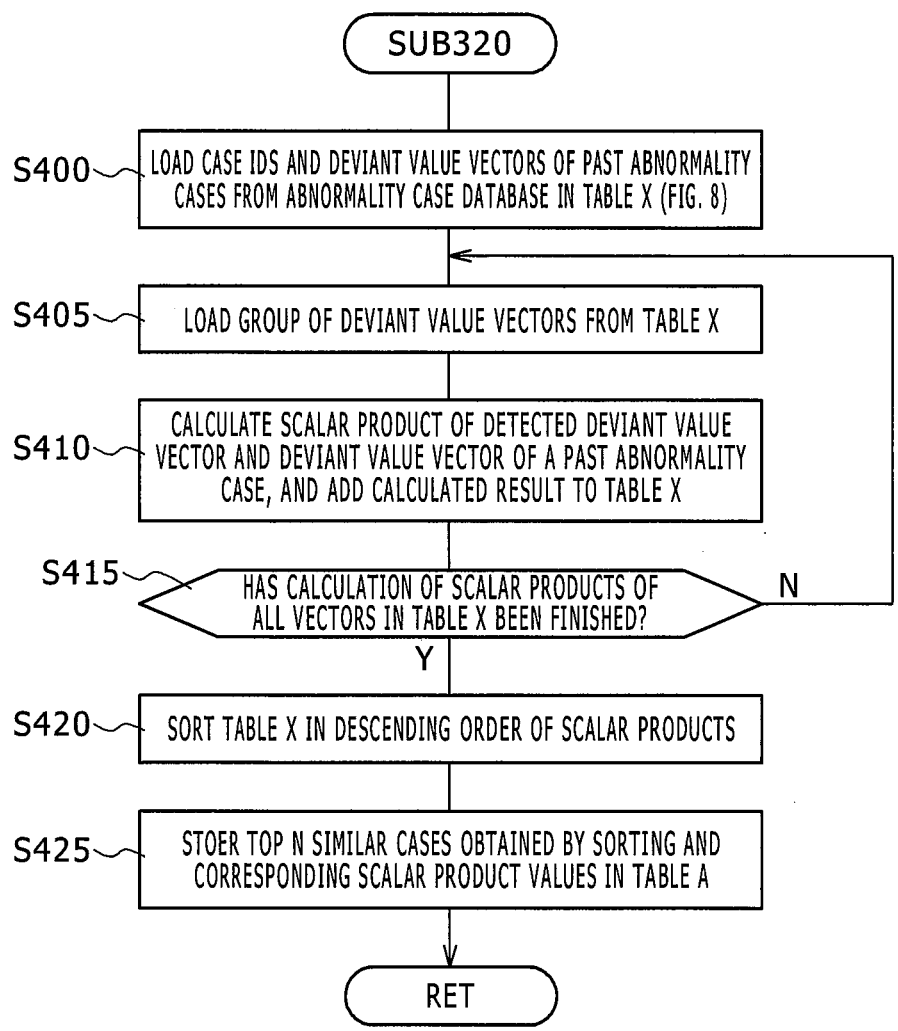
FIG. 6 is a process flowchart showing the processing of a subroutine SUB320 shown in FIG. 5.

Hereinafter, an embodiment of the present invention will be explained with reference to the accompanying drawings.

Embodiment

FIG. 1 is a diagram showing the entire configuration of a device for searching for similar breakdown cases according to the present invention. The device for searching for similar breakdown cases 1 according to the present invention obtains necessary information necessary for searching for breakdown cases from a maintenance target machine M, for example, from a construction machine such as a truck or a loader, or from an industrial machine such as an elevator.

The device for searching for similar breakdown cases 1 includes: a display unit 10 having a liquid crystal display, which displays the search results of similar cases and the like; an abnormality detection unit 11 that detects the abnormality of the diagnosis target machine M using sensor data sent from sensors mounted on various portions of the machine M via a communication device and the like; databases DB that store various data (an abnormality case database DB1, an inspected component database DB2, and an abnormality-causing component database DB3); several calculation units (an abnormality case search unit 12, an inspected component search unit 13, a priority level calculation unit 14; an abnormality case registration unit 15); and a temporary storage file 16 that temporarily stores data, and the like.

Hereinafter, the functions of these units included in the device will be explained First, the abnormality detection unit 11 that detects the abnormality of the machine will be explained. However, because many methods about abnormality detection have already been known, only a typical example will be introduced below.

In an abnormality detection method, there are normal ranges, which have been clear in terms of design, for respective sensor data values, and if any sensor data value goes beyond its limit, it is judged that an abnormality has occurred. Alternatively, there is a well-known technology in which normal ranges for sensor values are determined by learning the distributions of the sensor values obtained when the machine is normally operating using a data mining method. With the use of the above well-known technologies, when sensor values go beyond their normal ranges, and an abnormality is detected, the abnormality detection unit 11 can calculates "deviant values" out of the normal ranges of respective sensors.

In this embodiment, it will be assumed that an n-dimensional sensor value vector is represented by (S1, S2, "3, . . . , Sn) using sensor data values S1, S2, S3, . . . , and Sn, which are obtained from plural sensors mounted on various portions of the machine M, and the normal range of the sensors are an n-dimensional sphere with its radius being R and the coordinates of its center being (01, 02, 03, . . . , 0n).

The condition that the sensor values are within the normal range can be expressed by Expression (1).
[Expression 1]

$$(S1,S2,S3, \ldots ,Sn)-(01,02,03, \ldots ,0n)|<R \quad (1)$$

If the sensor values do not satisfy the above condition, a deviant value vector out of the normal range of the sensor values can be calculated.

In this embodiment, the deviant value vector (d1, d2, d3, . . . , dn) is defined by the following Expression (2).
[Expression 2]

$$(d1,d2,d3, \ldots ,dn)=(S1,S2,S3, \ldots ,OS)- (01,02,03, \ldots ,0n) \quad (2)$$

If the sensor value vector (S1, S2, S3, . . . , Sn) deviates from the normal range, the abnormal detection unit 11 outputs the deviant value vector (d1, d2, d3, . . . , dn) as the result of abnormality detection.

If the deviant value vector (d1, d2, d3, . . . , dn) is obtained, the type of the abnormality can be known by "direction" of the vector. For example, if the value of an engine temperature sensor goes beyond its upper limit, the component of the engine temperature sensor of the components of the deviant vector (d1, d2, d3, . . . , dn) becomes large. As a result, because the direction of the deviant vector (d1, d2, d3, . . . , dn) tilts toward the coordinate axis of the engine temperature sensor, an abnormality mode of "abnormality about the upper limit of engine temperature" is known.

The detection result or abnormality mode given by the abnormality detection unit 11, which detects the abnormality of the machine, is displayed on the display unit 10. After a tinge of the analysis result given by a maintenance person is added to the detection result or abnormality mode, the detection result or abnormality mode is registered in the abnormality case database DB1 as abnormality case information. Alternatively, it is conceivable that, after the detection result or abnormality mode is temporarily registered in the abnormality case database DB1, a tinge of the analysis result given by the maintenance person is added to the detection result or abnormality mode, and the detection result or abnormality mode is registered again.

In such a way as mentioned above, deviant value vectors of abnormality cases that happened in the past are stored in the abnormality case database DB1. FIG. 2 shows a concrete case of the abnormality case database DB1 built up in such a way.

In the concrete case of the abnormality case database DB1, the reference sign 205 shows case IDs that identify respective abnormality cases, the reference sign 210 shows the occurrence dates and times of respective abnormality cases, the reference sign 215 shows deviant value vectors calculated from sensor values of the machine when abnormalities occur in the machine, reference sign, 220 shows processing contents in which what kinds of processing have been taken to recover or remedy the machine when abnormalities occur in the machine is recorded, and the reference sign 225 shows abnormality mode IDs that are known through the analysis of generated abnormalities performed by a maintenance person or a designer of the machine. Individual data stored in 205 to 225 are associated with each other, and, for example, using the value of a deviant value vector 215, the corresponding processing content 220 or abnormality mode ID 225 can be obtained.

Among the above IDs, the abnormality mode IDs 225 are IDs that show the modes of abnormalities that occur in the machine M and that are defined by the designer of the machine M or the maintenance person. An abnormality mode is determined by the maintenance person or the designer of the machine after the maintenance person or the designer actually analyzes the abnormality and performs processing for remedying the machine. For example, if the value of the engine temperature sensor of the components of the deviant value vector goes beyond its upper limit, an abnormality mode ID showing "abnormality about the upper limit of engine temperature" is added to the abnormality case database.

According to the case ID "C001" in this abnormality case database DB1, an abnormality occurred at 13:00 on Feb. 2, 2011, and the corresponding deviant value vector (d1, d2, d3, . . . , dn) was (0.001, 0.3, . . . ). This abnormality was eventually recovered by reset processing, and the corresponding abnormality mode defined by the maintenance person was "A001". According to the case ID "C002", an abnormality occurred at 23:34 on Mar. 12, 2011, and the corresponding deviant value vector (d1, d2, d3, . . . , dn) was (0.14, 0.09, . . . ). This abnormality is eventually, recovered by replacing a component P002, and the corresponding abnormality mode defined by the maintenance person was "A002".

The abnormality-causing component database DB2, whose detailed contents are shown in FIG. 3, stores causal component candidate IDs 260 in association with the abnormality mode IDs 225 in the abnormality case database DB1. In this abnormality-causing component database DB2, the abnormality mode IDs 225 are IDs that show the abnormality modes, and the causal component candidate IDs 260 store component candidates, which cause the abnormality modes to occur, in association with Component IDs.

According this abnormality-causing-component database DB2, it turns out that, if an abnormality mode ID 225 is "A001", possible breakdown components are P001, P020, P041, and the like, and if an abnormality mode ID 225 is "A002"; possible breakdown components are P002, P067, P045, and the like.

In the inspected component database DB3 whose detailed contents are shown in FIG. 4, repair/replacement components 290 and an inspection cause 295 for each repair/replacement date and time 285 are stored. Here, the IDs of repaired or replaced components are stored in the repair/replacement components 290, and reasons such as "periodic inspection" or "response to abnormality" that are reasons for repair or replacement of components are stored in the inspection cause 295. Because this inspected component database DB3 stores the repair/replacement histories of components, not only repairs/replacements of components at the times of occurrences of abnormalities but also repairs/replacements of components at the times' of periodic inspections are integrally stored in this database.

For example, the uppermost row of the inspected component database DB3 shows a case in which the repair/replacement performed at 13:00 on 2 Feb. 2011 was a periodic inspection, and a component P002 and the like were repaired or replaced, and the middle row shows a case in which the repair/replacement performed at 23:34 on 12 Mar. 2011 was a response to an abnormality, and a component P002 was repaired or replaced. In this database, all repairs or replacements of components are recorded regardless of their inspection causes.

The processing contents of the abnormality detection unit 11 and the concrete storage contents of the databases (the abnormality case database DB1, the inspected component database DB2, and the abnormality-causing component database DB3) have been explained so far.

On the other hand, the calculation units (the abnormality case search unit 12, the inspected component search unit 13, the priority level calculation unit 14; the abnormality case registration unit 15), and a temporary storage file 16 that temporarily stores data perform various pieces of processing as follows.

First, the abnormality case detection unit 12 searches for a similar abnormality case in the abnormality case database DB1 using the deviant value vector (d1, d2, d3, . . . , dn) 215 of the machine M output by the abnormality detection unit 11 as a search key.

The inspected component search unit 13 searches the inspected component database DB3 to search for components of the machine replaced during the time period from the occurrence of a similar abnormality case in the past to the present time. It can be said that the smaller the number of components replaced is, the more similar to the present condition of the machine M the condition of the machine was.

The temporary storage file 16 is a file that temporarily stores the search results obtained by searching the abnormality case database DB1 performed by the abnormality case search unit 12 and the search results obtained by searching the inspected component database DB3 performed by the inspected component search unit 13.

The priority level calculation unit 14 determines the display order of the search results on the basis of the deviant value vector (d1, d2, d3, . . . , dn) output by the abnormality detection unit 11 and the number of searched-for components output by the inspected component search unit 13. This procedure will be described in detail later.

The abnormality case registration unit 15 registers information about generated abnormality cases in the abnormality case database DB1. The information to be registered is information determined by the maintenance person or the designer after they actually analyze abnormality cases.

Processing performed for searching for or displaying similar abnormality cases in the configuration of the device shown in FIG. 1 will be described with reference to the process flowcharts of FIG. 5 to FIG. 7. First, FIG. 5 is a process flowchart showing the entire processing.

In FIG. 5, sensor data are sent from sensors mounted on various portions of the machine M at the first process step S300, and the abnormality detection unit 11 receives these sensor data.

At step S305, the condition of the machine M is diagnosed by checking whether each sensor value (S1, S2, S3, . . . , or Sn) deviates from its normal range learned by the data mining method or determined at the design phase or not. If any of the sensor value deviates from its normal range, it is judged that the machine M is abnormal, and the flow proceeds to step S315 (Y at step S310). If it is judged that no abnormality has occurred in the machine M (N at step S310), the flow goes back to step S300, and the abnormality detection unit 11 waits for sensor data sent from the machine M.

At step S315, since each sensor value (S1, S2, S3, . . . , or Sn) deviates from its normal range, a deviant value vector ((d1, d2, d3, . . . , dn)=(S1, S2, S3, . . . , Sn)−(01, 02, 03, . . . , 0n)) is calculated, and it is input into a subroutine SUB320.

The internal flow of the subroutine SUB320 that receives the deviant value vector (d1, d2, d3, . . . , dn) is shown by step S400 to step S425 in FIG. 6.

At step S400, the case IDs 205 and deviant value vectors 215 all the past abnormality cases are loaded from the abnormality case database DB1 into the temporary storage file 16. The configuration of the loaded data is a table configuration in which the case Ids 205 and the deviant value vectors 215 are associated with each other as shown by a table X in FIG. 8. Here, FIG. 8 is a diagram showing the transition of information loaded into the temporary storage file 16.

In this case, a deviant value vector (0.001, 0.3, . . . ) associated with the case ID "C001", a deviant value vector (0.14, 0.09, . . . ) associated with the case ID "C002", and a deviant value vector (0.16, 0.07, . . . ) associated with the case ID "C003" are extracted in the table X (TBX) as all the past abnormality cases.

Figure 8:
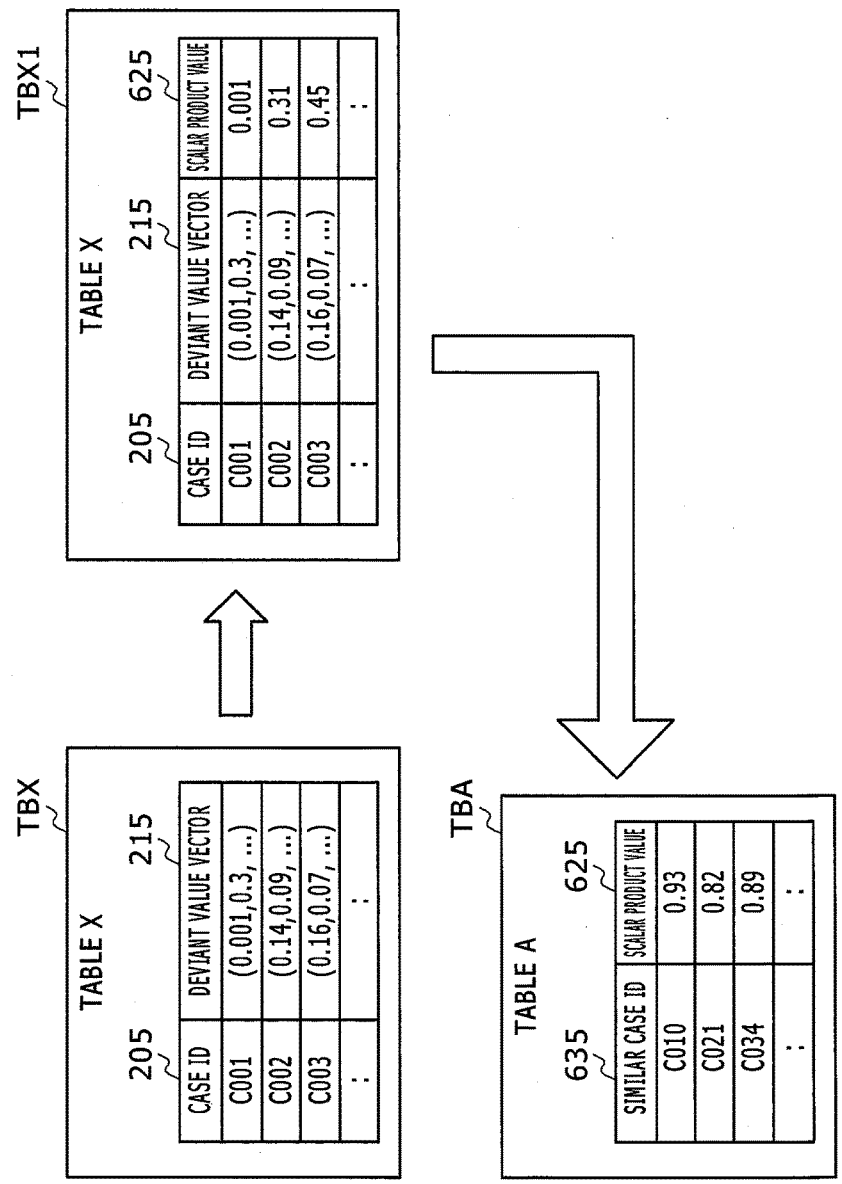
FIG. 8 is a diagram showing the transition of information loaded into a temporary storage file 16.

In a loop of the following steps S405, S410, and S420, the deviant value vectors stored in the table X (TBX) in FIG. 8 are brought out one by one to search for similar deviant value vectors.

To put it concretely, first at step S405, the deviant value vector (0.001, 0.3, . . . ) of "C001" in the uppermost row of the table X (TBX) in FIG. 8 is referred to.

At the next step S410, the correlation between the deviant value vector (d1, d2, d3, . . . , dn) of the latest abnormality detection case and a past case. As a correlation derivation method, there is a method of using a scalar product, for example. To put it concretely, the scalar product of the deviant value vector (d1, d2, d3, . . . , dn), which this subroutine SUB305 receives, and each of deviant value vectors 215 of the past abnormality cases are calculated. The scalar product value K of the deviant value vector (d1, d2, d3, . . . , dn) and the deviant value vector 215 (0.001, 0.3, . . . ) of the past abnormality case shown in FIG. 8 can be calculated using Expression (3).
[Expression 3]

$$K=(d1\times 0.001+d2\times 0.3+ \ldots )/(d1^2+d2^2+ \ldots + dn^2)^{1/2}\times (0.001^2+d2^2+ \ldots +dn^2)^{1/2} \quad (3)$$

Scalar product values K obtained using Expression (3) are added to the case ID table X (TBX) as a column 625. The configuration of the table X (TBX) to which the scalar product values K have been added is shown as a table X1 (TBX1) in FIG. 8. Scalar product values 625 are included in the TBX1 in comparison with the TBX. It will be assumed that the added scalar product values K are respectively 0.031, 0.31, and 0.45 from the uppermost row.

At the next step S415, whether a scalar product value K of each of all the cases in the table X and the input deviant value vector (d1, d2, d3, . . . , dn) has been calculated or not is checked, and if not, the flow goes back to step S405, and a scalar product value about the next case (the case ID C002~) is calculated.

If all the past cases and the input deviant value vector (d1, d2, d3, . . . , dn) are checked in the above loop of steps S405, S410, and S420, the flow proceeds to step S420.

At step S420, the cases are sorted in descending order of scalar product values 625 with reference to scalar product values 625 in the table X1 (TBX1).

At step S425, the top N case IDs 605 and the corresponding deviant value vectors 215 are brought out from the sorted table X1 (TBX1), and they are loaded into the temporary storage file 16 as a table A (TBA). In this case, it will be assumed that data is stored in a table A (TBA) in such a way that the case ID C010 with its scalar product value 0.93, the case ID C021 with its scalar product value 0.82, and the case ID C034 with its scalar product value 0.89 are disposed in this order.

Here, the case IDs that are disposed in descending order of scalar product values in the table A (TBA) are positioned as similar case IDs 635 in the table A (TBA). In this way, the top N case IDs 205 and the corresponding scalar product values 625 in the table X1 (TBX1) are loaded into the table A (TBA) as the similar case IDs 635 and the corresponding scalar product values 625 in the table A (TBA). In addition, the value of the number N used in "the top N case IDs" is the number of cases displayed on the display unit 10 as the search results of similar cases. The number of the search results to be displayed can be arbitrarily determined in accordance with the size, of the liquid crystal monitor of the display unit 10 or the work-related matters of a maintenance person.

As the result of the processing shown in FIG. 6, it can be said that the case ID C010 that is loaded into the table A (TBA) in the temporary storage file 16 and whose scalar product value is 0.93 is an abnormality case that has the highest correlation with the abnormality case detected this time. According to the present invention, the tinges of the repair/replacement histories of components are added to the above results. This part of processing is shown in FIG. 7.

As described above, the subroutine SUB320 shown in FIG. 6, in which the similar cases regarding the deviant value vector of the detected abnormality are searched for, and the search results are stored in the table A (TBA) in the temporary storage file 16, is finished, and the flow proceeds to step S322 in FIG. 5.

The flow goes back to the process flowchart shown in FIG. 5, and in processing from step S322 to step S332 whether there is a component replaced or repaired during the time period from the occurrence of a similar case listed in the table A (TBA) to the present time or not is checked for each of the similar cases.

At step S322, a pair of a similar case ID 635 and the corresponding scalar product value 625, which forms apiece of similar case information and is recorded in a row, is brought out from the table A (TBA) stored in the subroutine SUB320, and the pair is input into a subroutine SUB325. A pair that is checked first is a pair of the similar case ID 635 which is C010 and the corresponding scalar product value 625 which is 0.93.

In the subroutine SUB325, components that are replaced or repaired during the time period from the occurrence of each of past cases to the detection of the current abnormality are searched for. The internal flow of the subroutine SUB325 is shown in FIG. 7.

Figure 7:
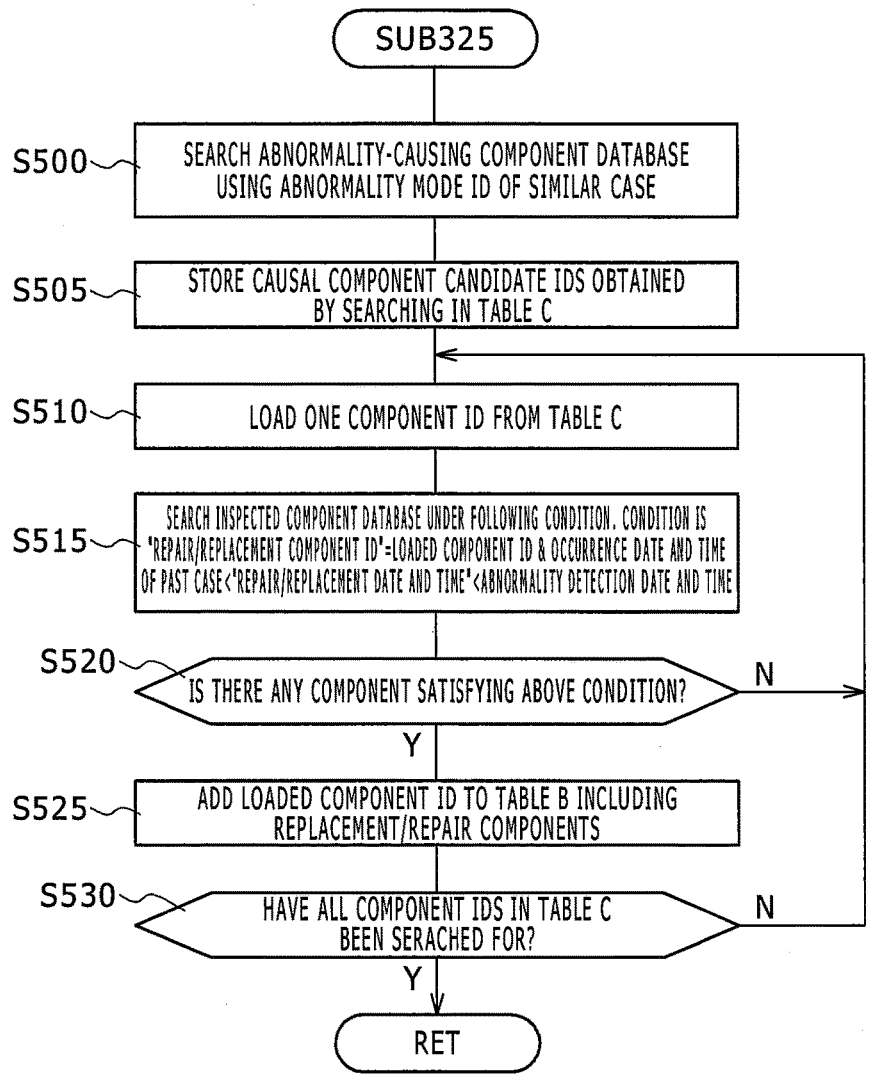
FIG. 7 is a process flowchart showing the processing of a subroutine SUB325 shown in FIG. 15

At step S500 in FIG. 7, both abnormality case database DB1 and causal component database DB3 are searched. First, the similar case ID 635 in the first row (the case judged that it has the highest correlation, that is the pair of the similar case ID 635 which is C010 and the corresponding scalar product value 625 which is 0.93.) is obtained with reference to the table. A (TBA) of the temporary storage file 16 in FIG. 8, and the similarity case ID 635 is used as a search key for searching the case ID 205 in the abnormality case database DB1 shown in FIG. 2.

By searching the abnormality case database DB1 as above, data, which is relevant to an occurrence date and time, a deviant value vector, a processing content, and an abnormality mode ID that are associated with the similarity case C010, is obtained. In this case, the next processing is performed using the data of the abnormality mode ID A010.

Using the abnormality mode ID 225 (A010) that is obtained as a result of searching for the similarity case ID 635 (C010), the abnormality mode ID 225 in the causal component database DB3 is searched, and the corresponding causal component candidate IDs 260 are obtained. In this case, the causal component candidates corresponding to the causal mode ID (A010) obtained from the causal component candidate ID 260 in the causal component database DB3 are P010, P015, and P021.

FIG. 9 is a diagram showing information expanded in the temporary storage file 16, and at first, information obtained as a result of the above processing is expanded in a table C (TBC). In this case, since the causal component candidate IDs 260 are disposed in the form of the list of component IDs as the obtained information, the causal component candidate IDs 260 are classified for each of the component IDs, and are disposed in the causal component candidate ID 260 of the table C (TBC) in the temporary storage file 16. In addition, the similarity case IDs 635 used as search keys are also disposed in the table C (TBC).

As a result of the above processing, the similarity case C010, which is calculated and known to have the highest correlation, and the corresponding causal component candidates P010, P015, and P021 are respectively disposed as three sets in the table C (TBC) in the temporary storage file 16 shown in FIG. 9. In addition, the case of the similarity case ID C021, which has the second highest correlation, is expanded in the table C (TBC) in a similar way to the above.

In a loop of the following steps S510 to S530, it is checked whether causal component candidates 260 in the table C are replaced or repaired during the time period from the occurrence of each of past cases to the present time when the abnormality is detected or not, and the result is stored in a table B TBB in FIG. 9.

At step S510, P010 is brought out from the table C (TEC) as a causal component candidate ID 260 in the first row, and at step S515, an inspection record whose repair/replacement date and time 285 is within the time period between "the occurrence date and time in FIG. 2" to "the date and time of detection of the abnormality" and whose repair/replacement component ID 290 includes the causal component candidate ID (P010) is searched for by searching the inspected component database DB2 shown in FIG. 4.

At step S520, if no record is searched for at step S515, the flow goes back to step S510 to search for the next causal component candidate ID. If there is a record that satisfies the above condition, the flow goes to step S525. In this explanation case, it will be assumed that the causal component candidate P010 has a repair/replacement record within the time period between "the occurrence date and time to the date and time of detection of the abnormality. In addition, it will be assumed that there also remains the repair history of P021.

At step S525, the casual component candidate (P010) that is used as the search key at step S515 and the similarity case ID (C010) associated with the casual component candidate (P010) are stored in the replacement/repair component ID 635290 and the similarity case ID 635 in the table B (TBB) shown in FIG. 9.

At step S530, it is checked whether all the causal component candidates 260 in the table C (TBC) have been searched for or not, and if not, the flow goes back to step S510, and the next causal component candidate P015 is searched for. After step S530, the subroutine 325 is finished, and the flow proceeds to step 330 in FIG. 3.

In this explanation case, replacement/repair components that are P010 and P021 are eventually extracted in the table B (TBB) regarding the similarity case ID C010. It will be assumed that there is no repair/replacement history of P015. In addition, as is the case with the above, it will be assumed that a replacement/repair component P034 is extracted regarding the similarity case ID (C021) that has the second highest correlation.

The flow goes back to FIG. 5. At step S330, regarding the similarity case ID 635 in the table A (TBA) created in the temporary storage file 16, the priority level L, which means the display order of the similarity case, is calculated by the following Expression (4) with the use of "the vector scalar product value 625" and "the replace/repair component ID 290", which is associated with "the vector scalar product value 625" via the similarity case ID 635, in the table B (TBB).

[Expression 4]

$$\text{Priority level } L = \alpha \times \text{"vector scalar product value"} + \beta \times \text{"ratio of replacement component"}(-1) \quad (4),$$

where "ratio of replacement component" is the value obtained by dividing "the number of replacement/repair component IDs that are associated with the same similarity case ID 635 in the table B (TBB)" by "the number of causal component candidate IDs that are associated with the same similarity case IDs 635 in the table C (TBC)".

The values of $\alpha$ and $\beta$ are weighting factors that have to be adjusted in accordance with works to which the present invention is applied.

Expression (4) will be explained using concrete numerical values. The case C010 that has the highest correlation shown in the table a (TBA) will be explained as an example, and the vector scalar product value obtained from Expression (4) is 0.93. Since "the number of replacement/repair component IDs 290" is 2 (P010 and P021), and "the number of causal component candidate IDs 260" is 3 (P010, P021, and P015), "ratio of replacement component" is 2/3. It will be assumed that the priority level L of the case C010 that is obtained as a numerical number 1.8 in consideration of the values of the weighting factors $\alpha$ and $\beta$. In addition, it will be assumed that the priority level L of the case C021 is obtained as a numerical number 2.2.

According to the priority level L given by Expression (4), a term regarding the weighting factor $\alpha$ is calculated to be a larger value if a case has higher correlations with past cases. On the other hand, a term regarding the weighting factor $\beta$ is counted as a larger negative value if the number of repairs/replacements becomes larger. As a result, Expression means that the larger the number of repairs/replacements, which is counted from the time when the last abnormality occurred to the machine M, becomes, the smaller the priority level becomes.

After the priority level is calculated, a table D (TBD) is created in the temporary storage file 16. The table D (TBD) stores the similar case IDs 635 in the table A (TBA) and the priority levels 765 with the similar case IDs 635 and the priority levels 765 associated with each other.

At step S332, it is checked whether the priority levels of all the similarity cases' in the table A (TBA) have been calculated or not. If not, the flow goes back to step S322, and the priority level of the next similarity case is calculated. If the priority levels of all the similarity cases have been calculated, the flow goes to step S335.

At step S335, similarity case IDs 635 are obtained in descending order of priority levels 765 in the table D (TBD), and each of the case IDs 205 in the abnormality case database DB1 is searched for using the corresponding similarity case ID 635 as a search key, and the corresponding piece of case information is found. By displaying the processing contents of found pieces of case information on the display unit 10, the processing contents of the machine, in which the abnormality was detected, can be shown to a maintenance person in descending order of priority levels.

Judging from the priority levels 765 in the table D (TBD) that has been eventually completed, it is evident that the maintenance person should be recommended to refer to the similarity case C021.

A diagnosis system according to the present invention adapts a similar case search technology in which, when the abnormality of a machine is detected, a database is searched to obtain abnormality cases similar to the abnormality of the machine, and even if the condition has changed owing to repairs or replacements of components, past abnormality cases with high degrees of similarity can be searched for and provided to a maintenance person.

LIST OF REFERENCE SIGNS

1: Device For Searching For Breakdown Cases, 10: Display Unit, 11: Abnormality Detection Unit, 12: Abnormality Case Search Unit, 13: Inspected Component Search Unit, 14: Priority Level Calculation. Unit, 15: Abnormality Case Registration Unit, 16: Temporary Storage File, DB1: Abnormality Case Database, DB2: Inspected Component Database, DB3: Abnormality-causing Component Database, M: Machine

The invention claimed is:

1. A device for searching for similar breakdown cases, comprising:
   one or more sensors disposed on a repair target machine to obtain sensor data of the repair target machine; and
   a computer programmed to:
   detect a signal abnormality from the sensor data obtained by the one or more sensors disposed on the repair target machine;
   calculate the correlations between the signal abnormality and past abnormality cases by means of quantification, and regard the past abnormality cases as similar abnormality cases;
   obtain component repair histories of the repair target machine in the similar abnormality cases by means of quantification; and
   in accordance with the quantified correlations and the quantified component repair histories, determine and provide priority levels of the plural past similar abnormality cases;
   wherein the computer is programmed to obtain the number of replacements of components during the time period from the occurrence of a similar abnormality case in the past to the present time from an inspected component database, and calculate the ratio of the number of replacements of the components to the number of breakdown-causing component candidates stored in an abnormality-causing components database for each of the abnormality modes;
   wherein the computer is programmed to weight the priority levels of similar abnormality detection cases in the past using the quantified correlations calculated by an abnormality case detection unit and the ratio between the components obtained by an inspected component search unit, and provide the weighted priority levels; and
   wherein the computer is programmed to weight the quantified correlation using a larger value for an abnormality case if the abnormality case has higher correlations with past abnormality cases, and weight the ratio between the components using a larger negative value if the number of replacements of components during the time period from the occurrence of a similar abnormality case in the past to the present time is larger.

2. The device for searching for similar breakdown cases according to claim 1, further comprising:
   an abnormality case database that stores abnormality detection cases that occurred in the past in association with corresponding abnormality modes;
   the abnormality-causing component database that stores breakdown-causing component candidates for each of the abnormality modes; and
   the inspected component database that stores the contents of the repairs/replacements of components that were performed in the past.

3. The device for searching for similar breakdown cases according to claim 2,
   wherein the inspected component database stores the repair/replacement histories of the components of a machine, and the repair/replacement history of a component can be searched for from the date and time of the replacement of the component and the type of the component.

4. The device for searching for similar breakdown cases according to claim 2,
   wherein the abnormality case database stores the abnormality cases of a machine that occurred in the past in association with information about the corresponding processing contents, and a processing content of the machine can be searched for from the corresponding date and time.

5. The device for searching for similar breakdown cases according to claim 2,
   wherein the abnormality case database stores the abnormality cases of a machine that occurred in the past in association with information about the corresponding processing contents, and a similar abnormality can be searched for from the analysis result of the sensor data at the time of the occurrence of an abnormality.

6. The device for searching for similar breakdown cases according to claim 2,
   wherein the computer is programmed to calculate the ratio of the number of repair component candidates stored in the abnormality-causing component database to the number of repaired or replaced components stored in the inspected component database.

7. The device for searching for similar breakdown cases according to claim 1,
   wherein the priority levels of the plural past similar abnormality cases are arranged in descending order to be used for repairing the repair target machine.

8. A device for searching for similar breakdown cases, comprising:
   one or more sensors disposed on a maintenance target machine to obtain sensor data of the maintenance target machine; and
   a computer programmed to:
   bring in a signal sent from the sensor data obtained by the one or more sensors disposed on the maintenance target machine, and detect an abnormality signal;
   store abnormality detection cases that occurred in the past in association with corresponding abnormality modes;
   store breakdown-causing component candidates for each of the abnormality modes;
   store the contents of the repairs/replacements of components that were performed in the past;
   calculate correlations between the abnormality signal and past abnormality cases stored in the abnormality case database by means of quantification on detecting the abnormality signal, and regard the past abnormality cases as similar abnormality cases;
   obtain the number of replacements of components during the time period from the occurrence of a similar abnormality case in the past to the present time from an inspected component database, and calculate the ratio of the number of replacements of the components to the number of breakdown-causing component candidates stored in an abnormality-causing components database for each of the abnormality modes; and
   weight priority levels of similar abnormality detection cases in the past using the quantified correlations calculated by an abnormality case detection unit and the ratio between the components obtained by an inspected component search unit, and provide the weighted priority levels;
   wherein the computer is programmed to weight the quantified correlation using a larger value for an abnormality case if the abnormality case has higher correlations with past abnormality cases, and weight the ratio between the components using a larger negative value if the number of replacements of components during the time period from the occurrence of a similar abnormality case in the past to the present time is larger.

9. The device for searching for similar breakdown cases according to claim 8,
wherein the priority levels of the plural past similar abnormality cases are arranged in descending order to be used for repairing the repair target machine.

10. A method for searching for similar breakdown cases, the method comprising:
storing abnormality detection cases in an abnormality case database that occurred in the past in association with corresponding abnormality modes;
storing breakdown-causing component candidates in an abnormality-causing component database for each of the abnormality modes;
disposing one or more sensors on a repair target machine to obtain sensor data of the repair target machine;
detecting a signal abnormality from the sensor data obtained by the one or more sensors disposed on the repair target machine;
calculating the correlations between the signal abnormality and past abnormality cases by means of quantification, wherein the past abnormality cases are regarded as similar abnormality cases;
obtaining the number of replacements of components during the time period from the occurrence of a similar abnormality case in the past to the present time from an inspected component database, and calculating the ratio of the number of replacements of the components to the number of breakdown-causing component candidates stored in the abnormality-causing components database for each of the abnormality modes;
weighting priority levels of similar abnormality detection cases in the past using the quantified correlations calculated by an abnormality case detection unit and the ratio between the components obtained by an inspected component search unit, and providing the weighted priority levels; and
weighting the quantified correlation using a larger value for an abnormality case if the abnormality case has higher correlations with past abnormality cases, and weighting the ratio between the components using a larger negative value if the number of replacements of components during the time period from the occurrence of a similar abnormality case in the past to the present time is larger.

11. The method for searching for similar breakdown cases according to claim 10, further comprising:
using the priority levels of the plural past similar abnormality cases which are arranged in descending order for repairing the repair target machine.

\* \* \* \* \*